(12) United States Patent
Choi et al.

(10) Patent No.: US 7,696,258 B2
(45) Date of Patent: Apr. 13, 2010

(54) PHOTO-CURABLE ADHESIVE COMPOSITION, OPTICAL PICK-UP DEVICE USING THE SAME AND OPTICAL RECORDING/REPRODUCING DRIVE INCLUDING THE OPTICAL PICK-UP DEVICE

(75) Inventors: Young-se Choi, Suwon (KR); Hyung-tae Kim, Seoul (KR); Do-hoan Nam, Suwon (KR); Soo-han Park, Youngin (KR); Dovid Azrielevich Aronovich, Dzerzhinsk (RU); Valentin Vasilievich Guzeev, Dzerzhinsk (RU); Vladimir Borisovich Mozzhukhin, Dzerzhinsk (RU); Alexandr Petrovich Sineokov, Dzerzhinsk (RU); Natalya Alexandrovna Ustyuzhantseva, Dzerzhinsk (RU); Zyakia Saibasakhovna Khamidulova, Dzerzhinsk (RU)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 853 days.

(21) Appl. No.: 11/439,429

(22) Filed: May 24, 2006

(65) Prior Publication Data
US 2007/0052796 A1 Mar. 8, 2007

Related U.S. Application Data

(63) Continuation of application No. PCT/RU03/000518, filed on Nov. 24, 2003.

(51) Int. Cl.
*C08F 299/00* (2006.01)

(52) U.S. Cl. .............................. 522/95; 522/79; 522/80; 522/83; 522/96; 522/173; 156/322; 369/292

(58) Field of Classification Search ................. 348/374; 522/79, 80, 83, 95, 96, 173; 156/325–332
See application file for complete search history.

(56) References Cited

U.S. PATENT DOCUMENTS

| 4,295,909 A | 10/1981 | Baccei |
| 6,017,603 A | 1/2000 | Tokuda et al. |
| 6,337,118 B1 * | 1/2002 | Takehana et al. ............ 428/64.1 |
| 6,472,451 B2 | 10/2002 | Ha et al. |
| 6,479,563 B1 * | 11/2002 | Liebing et al. ................. 522/13 |

FOREIGN PATENT DOCUMENTS

RU   2 138 529   9/1999

* cited by examiner

*Primary Examiner*—Sinh Tran
*Assistant Examiner*—Anthony J Daniels
(74) *Attorney, Agent, or Firm*—Lee & Morse, P.C.

(57) ABSTRACT

A photo-curable adhesive composition including an oligourethane acrylate in a range of about 10 to about 30% by weight, a reactive monomer-diluent in a range of about 32 to about 46% by weight, a polymeric filler in a range of about 20 to about 30% by weight, a photoinitiator in a range of about 2.5 to about 5.0% by weight, an antioxidant in a range of about 0.005 to about 0.02% by weight, a chlorinated polyvinyl chloride in a range of about 3.0 to about 10%, the chlorinated polyvinyl chloride having a chlorine content of about 62 to about 64% by weight, oxalic acid in a range of about 0.3 to about 2.0% by weight, a thixotropic agent in a range of about 0.5 to about 3.0% by weight, and a plasticizer in a range of about 1.0 to about 10.0% by weight, based on the total weight of the composition.

17 Claims, 5 Drawing Sheets

| Components of the composition | Content (% by weight) | | | |
|---|---|---|---|---|
| | Example 3 | Comparative Example 4 | Comparative Example 5 | Comparative Example 6 |
| OUMD-3000H | 8.1 | 8.1 | 8.1 | 8.1 |
| OUMD-3000T | 7.5 | 7.5 | 7.5 | 7.5 |
| Isobornylmethacrylate | 15.2 | 15.2 | 15.2 | 15.2 |
| Dicyclopentenyloxyethylmethacrylate | 28.4 | 28.4 | 28.4 | 28.4 |
| Trimethacrylatetrimethylolpropane | 0.5 | 0.5 | 0.5 | 0.5 |
| Octylmethacrylate | 1.8 | 1.8 | 1.8 | 1.8 |
| Chlorinated PVC | 4.2 | 4.2 | - | 4.2 |
| Oxalic acid | 0.7 | - | 0.7 | - |
| Acrylic acid | - | 1.1 | - | - |
| Dioctylphthalate | 1.8 | 1.8 | 1.8 | 1.8 |
| Aerosil A-175 | 1.6 | 1.6 | 1.6 | 1.6 |
| BYK 410 | 0.1 | 0.1 | 0.1 | 0.1 |
| BYK S-740 | 0.8 | 0.4 | 0.8 | 0.8 |
| Irgacure 184 | 2.9 | 2.9 | 2.9 | 2.9 |
| Irgacure 651 | 0.7 | 0.7 | 0.7 | 0.7 |
| Polyethylene | 25.7 | 25.7 | 29.9 | 26.4 |
| p-Methoxyphenol | 0.01* | 0.01* | 0.01* | 0.01* |

* 0.01 – parts by weight per 100 parts by weight of the composition.

FIG. 6

| Components of the composition | Content (% by weight) | | | | |
|---|---|---|---|---|---|
| | Example 3 | Comparative Example 4 | Comparative Example 5 | Comparative Example 6 |
| OUMD-3000H | 8.1 | 8.1 | 8.1 | 8.1 |
| OUMD-3000T | 7.5 | 7.5 | 7.5 | 7.5 |
| Isobornylmethacrylate | 15.2 | 15.2 | 15.2 | 15.2 |
| Dicyclopentenyloxyethylmethacrylate | 28.4 | 28.4 | 28.4 | 28.4 |
| Trimethacrylatetrimethylolpropane | 0.5 | 0.5 | 0.5 | 0.5 |
| Octylmethacrylate | 1.8 | 1.8 | 1.8 | 1.8 |
| Chlorinated PVC | 4.2 | 4.2 | - | 4.2 |
| Oxalic acid | 0.7 | - | 0.7 | - |
| Acrylic acid | - | 1.1 | - | - |
| Dioctylphthalate | 1.8 | 1.8 | 1.8 | 1.8 |
| Aerosil A-175 | 1.6 | 1.6 | 1.6 | 1.6 |
| BYK 410 | 0.1 | 0.1 | 0.1 | 0.1 |
| BYK S-740 | 0.8 | 0.4 | 0.8 | 0.8 |
| Irgacure 184 | 2.9 | 2.9 | 2.9 | 2.9 |
| Irgacure 651 | 0.7 | 0.7 | 0.7 | 0.7 |
| Polyethylene | 25.7 | 25.7 | 29.9 | 26.4 |
| p-Methoxyphenol | 0.01* | 0.01* | 0.01* | 0.01* |

* 0.01 – parts by weight per 100 parts by weight of the composition.

FIG. 7

| Properties | Example 3 | Comparative Example 4 | Comparative Example 5 | Comparative Example 6 |
|---|---|---|---|---|
| Shrinkage (%) | 3.7 | 3.7 | 3.7 | 3.7 |
| Tensile strength (MPa) | | | | |
| I | 8.2 | 4.3 | 3.1 | 3.0 |
| II | 3.4 | 1.8 | 0.5 | 0.6 |
| III | 5.0 | 1.7 | - | - |
| Storage stability (year) | 1 | 0.5 | - | - |

PHOTO-CURABLE ADHESIVE COMPOSITION, OPTICAL PICK-UP DEVICE USING THE SAME AND OPTICAL RECORDING/REPRODUCING DRIVE INCLUDING THE OPTICAL PICK-UP DEVICE

CROSS-REFERENCE TO RELATED APPLICATION

The present application is a continuation application of International Application No. PCT/RU2003/000518, filed on Nov. 24, 2003, the entire contents of which are incorporated herein by reference for all purposes, and is related to commonly assigned U.S. application Ser. No. 11/439,430, filed on May 24, 2006, entitled "Photo-curable Adhesive Composition, Optical Pick-up Device Using the Same, and Optical Recording/Reproducing Drive Including the Optical Pick-up Device," the entire contents of which are incorporated herein by reference for all purposes.

BACKGROUND OF THE INVENTION

1. Field of the Invention

The present invention relates to a photo-curable adhesive composition. More particularly, the present invention relates to a photo-curable adhesive composition suitable for use as an adhesive between metal structures and polymethylmethacrylate in electronic devices such as, e.g., an optical pick-up device, a thin film transistor-liquid crystal display (TFT-LCD), an organic electro-luminescent (EL) device, etc.

2. Description of the Related Art

Generally, electronic devices, e.g., optical recording/reproducing drives such as CD drives, DVD drives, blu-ray drives, etc., that include optical elements, may have optical elements adhered to a base. The base may be, e.g., a metal base. A method of securing the optical element to the base may include providing an adhesive between the optical element and the base, and then curing (hardening) the adhesive.

Adhesives that are curable with ultraviolet light (photo-curable or UV-curable adhesives) may be used to secure an optical element to a base. Photo-curable adhesives may exhibit various properties besides adhesion. For example, photo-curable adhesives may be thixotropic, may provide sealing properties, may be photo- and heat-curable, etc. Such properties may be advantageous depending on the nature of the device being manufactured and the particular manufacturing process. Further, the cured photo-curable adhesives may exhibit a variety of material characteristics, e.g., strength, shrinkage, etc., that may be controlled by modifying the composition or the photo-curable adhesive and/or the application thereof.

Moreover, adhesives may be formed from a variety of different materials, e.g., polymers of various types, and may be modified in a number of ways, e.g., through the addition of polymerization initiators and/or regulators, hydrophobic and/or hydrophilic modifiers, fillers such as inorganic fillers, thixotropic agents, etc.

Depending on the nature of the device being manufactured and the particular manufacturing process, the absence of one or more of the above properties or characteristics may lead to a low-quality adhesive joint, distortion of the optical characteristics of the resultant electronic devices, etc.

SUMMARY OF THE INVENTION

The present invention is therefore directed to a photo-curable adhesive composition, an optical pick-up device using the same and an optical recording/reproducing drive including the optical pick-up device, which substantially overcome one or more of the problems due to the limitations and disadvantages of the related art.

It is therefore a feature of an embodiment of the present invention to provide a photo-curable adhesive composition suitable for use as an adhesive between metal bases and polymethylmethacrylate in electronic devices, optical pick-up devices including the same, and optical recording/reproducing drives having the optical pick-up devices.

It is therefore another feature of an embodiment of the present invention to provide a photo-curable adhesive composition that exhibits thixotropy, low shrinkage, high adhesion strength even when subjected to moisture and/or heat, and good storage properties.

At least one of the above and other features and advantages of the present invention may be realized by providing a photo-curable adhesive composition including an oligourethane acrylate in a range of about 10 to about 30% by weight, a reactive monomer-diluent in a range of about 32 to about 46% by weight, a polymeric filler in a range of about 20 to about 30% by weight, a photoinitiator in a range of about 2.5 to about 5.0% by weight, an antioxidant in a range of about 0.005 to about 0.02% by weight, a chlorinated polyvinyl chloride in a range of about 3.0 to about 10%, the chlorinated polyvinyl chloride having a chlorine content of about 62 to about 64% by weight, oxalic acid in a range of about 0.3 to about 2.0% by weight, a thixotropic agent in a range of about 0.5 to about 3.0% by weight, and a plasticizer in a range of about 1.0 to about 10.0% by weight, based on the total weight of the composition.

The chlorinated polyvinyl chloride and the oxalic acid may be added as an adhesion promoter, the chlorinated polyvinyl chloride and the oxalic acid added in a mass ratio in a range of about 5:1 to about 10:1. The oligourethane acrylate may be a mixture of aliphatic and aromatic oligobutadiene urethane methacrylate, the aliphatic and aromatic oligobutadiene urethane methacrylate mixed in a mass ratio in a range of about 1:1 to about 1.5:1. The reactive monomer-diluent may be a mixture of a monofunctional methacrylate having cyclic substituents, a methacrylate of a higher alcohol, and a polyfunctional methacrylate. The polymeric filler may include powdered high density polyethylene having a grain size of about 50 μm or less.

At least one of the above and other features and advantages of the present invention may also be realized by providing an optical pick-up device including a base and at least one optical element that is adhered to the base using a photo-curable adhesive composition, the photo-curable adhesive composition including an oligourethane acrylate in a range of about 10 to about 30% by weight, a reactive monomer-diluent in a range of about 32 to about 46% by weight, a polymeric filler in a range of about 20 to about 30% by weight, a photoinitiator in a range of about 2.5 to about 5.0% by weight, an antioxidant in a range of about 0.005 to about 0.02% by weight, a chlorinated polyvinyl chloride in a range of about 3.0 to about 10%, the chlorinated polyvinyl chloride having a chlorine content of about 62 to about 64% by weight, oxalic acid in a range of about 0.3 to about 2.0% by weight, a thixotropic agent in a range of about 0.5 to about 3.0% by weight, and a plasticizer in a range of about 1.0 to about 10.0% by weight, based on the total weight of the composition.

The optical element may be an optical diode, a grating, a collimating lens, a beam splitter, a reflective mirror, a light detector, a front light detector, an objective lens, a concave lens, and a base cover. The optical element may be disposed in a light path of an optical recording/reproducing drive.

At least one of the above and other features and advantages of the present invention may further be realized by providing a photo-curable adhesive composition, the photo-curable composition prepared by mixing an oligourethane acrylate, a reactive monomer-diluent, a polymeric filler, a photoinitiator, an antioxidant, a chlorinated polyvinyl chloride having a chlorine content of about 62 to about 64%, oxalic acid, a thixotropic agent, and a plasticizer, wherein the oligourethane acrylate is added in a range of about 10 to about 30% by weight, the reactive monomer-diluent is added in a range of about 32 to about 46% by weight, the polymeric filler is added in a range of about 20 to about 30% by weight, the photoinitiator is added in a range of about 2.5 to about 5.0% by weight, the antioxidant is added in a range of about 0.005 to about 0.02% by weight, the chlorinated polyvinyl chloride is added in a range of about 3.0 to about 10% by weight, the oxalic acid is added in a range of about 0.3 to about 2.0% by weight, the thixotropic agent is added in a range of about 0.5 to about 3.0% by weight, and the plasticizer is added in a range of about 1.0 to about 10.0% by weight, based on the total weight of the composition.

The oligourethane acrylate may include a first oligourethane acrylate and a second oligourethane acrylate, and the first and second oligourethane acrylates, combined, may be added in a range of about 10 to about 30% by weight, based on the total weight of the composition. The first oligourethane acrylate may be prepared by adding hexamethylene diisocyanate to oligobutadienediol and allowing them to react, adding a solution containing dibutyl tin caprylate dissolved in monomethacrylate propyleneglycol to the reaction product of the hexamethylene diisocyanate and oligobutadienediol, allowing substantially all of any remaining isocyanate groups to react, and adding p-methoxyphenol. The oligobutadienediol, the hexamethylene diisocyanate and the monomethacrylate propyleneglycol may be combined in molar ratio of 1:2:2. The oligobutadienediol may be a polymerization product of 1,3-butadiene containing monomer links through 1,4- and 1,2-addition reactions, the oligobutadienediol containing about 30% of 1,4-adducts and about 70% of 1,2-adducts.

The second oligourethane acrylate may be prepared by adding 2,4-toluylene diisocyanate to oligobutadienediol and allowing them to react, adding a solution containing dibutyl tin caprylate dissolved in monomethacrylate propyleneglycol to the reaction product of the 2,4-toluylene diisocyanate and oligobutadienediol, allowing substantially all of any remaining isocyanate groups to react, and adding p-methoxyphenol. The oligobutadienediol, the 2,4-toluylene diisocyanate and the monomethacrylate propyleneglycol may be combined in molar ratio of 1:2:2. The oligobutadienediol may be a polymerization product of 1,3-butadiene containing monomer links through 1,4- and 1,2-addition reactions, the oligobutadienediol containing about 30% of 1,4-adducts and about 70% of 1,2-adducts.

The chlorinated polyvinyl chloride and the oxalic acid may be present in a mass ratio in a range of about 5:1 to about 10:1.

BRIEF DESCRIPTION OF THE DRAWINGS

The above and other features and advantages of the present invention will become more apparent to those of ordinary skill in the art by describing in detail exemplary embodiments thereof with reference to the attached drawings in which:

FIG. 6 tabulates components and component amounts for Example 3 of a photo-curable adhesive composition according to an embodiment of the present invention, as well as Examples 4-6 of comparative photo-curable adhesive compositions; and FIG. 7 tabulates shrinkage, tensile strength and storage stability for Example 3 of a photo-curable adhesive composition according to an embodiment of the present invention, as well as Examples 4-6 of comparative photo-curable adhesive compositions.

DETAILED DESCRIPTION OF THE INVENTION

Figure 1:
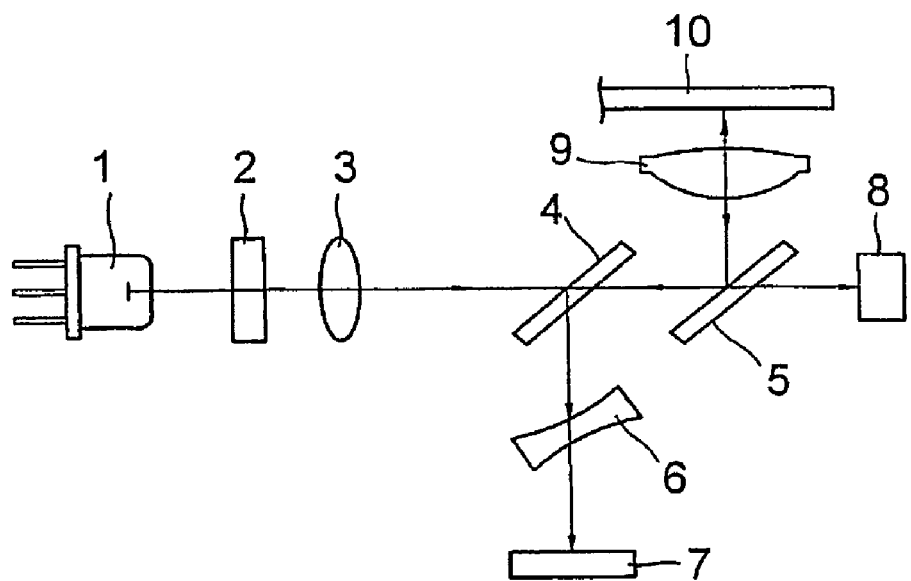
FIG. 1 illustrates an optical system having an optical pick-up device using the photo-curable adhesive composition according to an embodiment of the present invention.

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the figures, the dimensions of layers and regions are exaggerated for clarity of illustration. It will also be understood that when a layer is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

The photo-curable adhesive composition according to the present invention may be used in electronic devices and may exhibit the following properties: thixotropy, low shrinkage, high adhesive strength, especially under the influence of moisture and heat, polymerization with low shrinkage, and long-term storage stability without undue loss of service characteristics.

In particular, the photo-curable adhesive composition may be curable with light, e.g., UV light, and may exhibit a thixotropic coefficient of about K=2-3, shrinkage of less than about 4%, good tensile strength for bonded of polymethylmethacrylate-metal (steel, 12×18H10T), both initially and after exposure to heat, moisture, and/or temperature cycling, and storage stability of a year or more.

A photo-curable adhesive composition according to an embodiment of the present invention may contain, in % by weight based on the total weight of the composition, an oligourethane methacrylate in a range of about 10 to about 30%, a monomer-diluent in a range of about 32 to about 46%, a polymer filler in a range of about 20 to about 30%, a photoinitiator in a range of about 2.5 to about 5.0%, an antioxidant in a range of about 0.005 to about 0.02%, a chlorinated polyvinyl chloride in a range of about 3.0 to about 10.0%, an oxalic acid in a range of about 0.3 to about 2.0%, a thixotropic agent in a range of about 0.5 to about 3.0%, a plasticizer in a range of about 1.0 to about 10.0%

The oligourethane methacrylate used in the photo-curable adhesive composition may be the reaction product of polybutadienediol having a molecular mass of about 2000-3000, an aliphatic or aromatic diisocyanate, and hydroxyalkyl(meth) acrylate, which may be combined in molar ratio 1:2:2. The polybutadienediol used therein may be, in turn, a product of polymerization of 1,3-butadiene containing monomer links through a 1,4 addition reaction and/or a 1,2 addition reaction, and may be an oligomer containing about 30% of 1,4 adducts and about 70% of 1,2 adducts. The diisocyanate may be, e.g., hexamethylene diisocyanate and its substituted analogues, isophorone diisocyanate, 2,4-toluylene diisocyanate, etc. The hydroxyalkyl(meth)acrylate may be, e.g., hydroxyethyl (meth)acrylate, hydroxypropyl(meth)acrylate, hydroxybutyl (meth)acrylate, etc.

Oligobutadiene urethane acrylates may be used in the form of individual compounds as well as in mixtures. For example, a mixture of aliphatic and aromatic urethane acrylate in mass ratio about 1:1 to about 1.5:1 may be used.

The monomer-diluent used in the photo-curable adhesive composition may include a mixture of monofunctional methacrylates with cyclic substituents (e.g., isobornyl-, tetrahydrofurfuryl-, dicyclopentenyloxyethyl-, etc.), methacrylate of a higher alcohol (e.g., octylmethacrylate), and polyfunctional methacrylates (e.g., triethyleneglycol dimethacrylate, trimethylolpropane trimethacrylate, etc.).

The thixotropic agent used in the photo-curable adhesive composition may be, e.g., Aerosil with specific surface area of 175-380 $m^2$/g, BYK-410, Texaphor P-61, etc. The plasticizer may be, e.g., dioctyl phthalate. The photoinitiator may be, e.g., Irgacure 181, Irgacure 651, a mixture thereof, etc. The polymer filler may be, e.g., powdered high density polyethylene having a grain size of about 50 μm or less.

The photo-curable adhesive composition may further include a mixture of chlorinated PVC dissolved in monomers having a chlorine content of about 62-64% and oxalic acid in order to increase the adhesion strength of the composition. About 3-10% by weight of chlorinated PVC may be used, and about 0.3-2% by weight of oxalic acid may be used, based on the total weight of the photo-curable adhesive composition. The mass ratio of the chlorinated PVC to the oxalic acid may be in a range of about 5:1 to about 10:1. The photo-curable adhesive composition according to an embodiment of the present invention may exhibit increased adhesion strength when bonding steel and polymethylmethacrylate as compared to similar adhesive compositions that lack chlorinated PVC and oxalic acid, as discussed in further detail in connection with FIGS. 6 and 7, below.

The photo-curable adhesive composition according to the present invention may be used in an optical pick-up device as part of an optical recording/reproducing drive. The optical pick-up device may include a base and optical elements that are adhered to the base using the photo-curable adhesive composition described above. The optical element may be disposed in a light path of the optical recording/reproducing drive.

FIG. 1 illustrates an optical system having an optical pick-up device using the photo-curable adhesive composition according to an embodiment of the present invention. Referring to FIG. 1, the optical pick-up device may include a light source 1 for emitting light with a predetermined wavelength, a grating 2 for diffracting light emitted from the light source into zero-order and first-order beams, and a collimating lens 3 for providing light waves that are parallel to one another.

The optical pick-up device may also include an objective lens 9 for forming an optical spot on the recording surface of an optical disk 10 and a main light detector 7 for receiving light reflected from the recording surface of the optical disk 10 and detecting signals, e.g., an information signal and an error signal.

The optical pick-up device may further include a beam splitter 4 for guiding light emitted from the light source 1 to the objective lens 9 and for guiding light reflected from the optical disk 10 to the main light detector 7. A concave lens 6 may be placed between the beam splitter 4 and the main light detector 7. The concave lens 6 may be used to correct astigmatism. A second beam splitter 5 may be used to diffract light guided to the objective lens 9 in the direction of the front light detector 8.

The front light detector 8 may be used to detect light power. If the detected light power is less than or exceeds a predetermined level, the power of light emitted from the light source 1 may be adjusted to allow light with power of a predetermined level to reach the optical disk 10.

Figure 2:
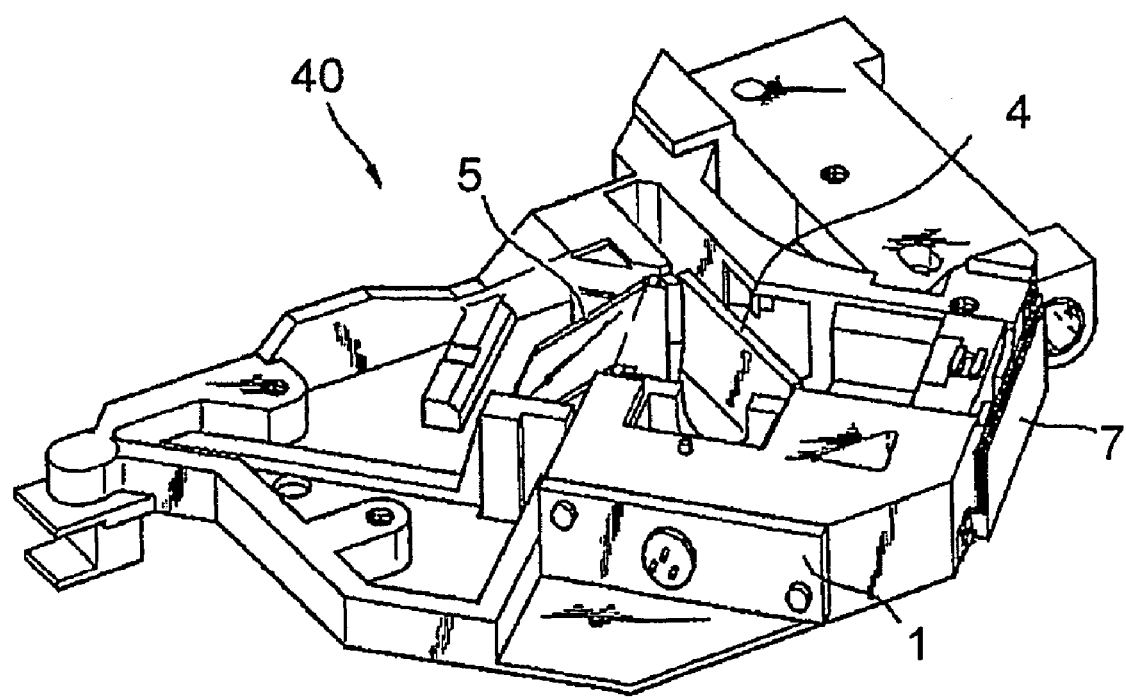
FIG. 2 illustrates an optical pick-up device using the photo-curable adhesive composition according to an embodiment of the present invention.

FIG. 2 illustrates an optical pick-up device using the photo-curable adhesive composition according to an embodiment of the present invention. Referring to FIG. 2, the optical pick-up device 40 may include a metal base, e.g., an aluminium base. The aforementioned optical elements may be placed on predetermined positions of the base and be fixed thereon using the photo-curable resin composition according to the present invention. For example, the grating may be fixed on a grating holder of the base, a laser diode may be fixed on a diode holder of the base, and the beam splitter 5 and collimating lens may be directly fixed on the base. The photo-curable resin composition according to the present invention may be applied to specific sites of the base or the optical elements and exposed to light to be cured.

Figure 3:
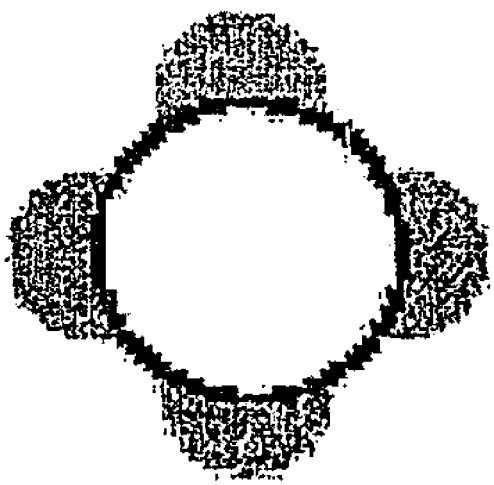
FIG. 3 illustrates a site to which the photo-curable adhesive composition according to an embodiment of the present invention is applied when an objective lens is adhered to a base in an optical pick-up device.

FIG. 3 illustrates a site to which the photo-curable adhesive composition according to an embodiment of the present invention is applied when an objective lens is adhered to a base in an optical pick-up device. Referring to FIG. 3, the objective lens may be adhered to an actuator blade of the base. After the photo-curable resin composition of the present invention is applied to four points of the actuator blade, the objective lens may be placed thereon and exposed to light to cure the composition.

Figure 4:
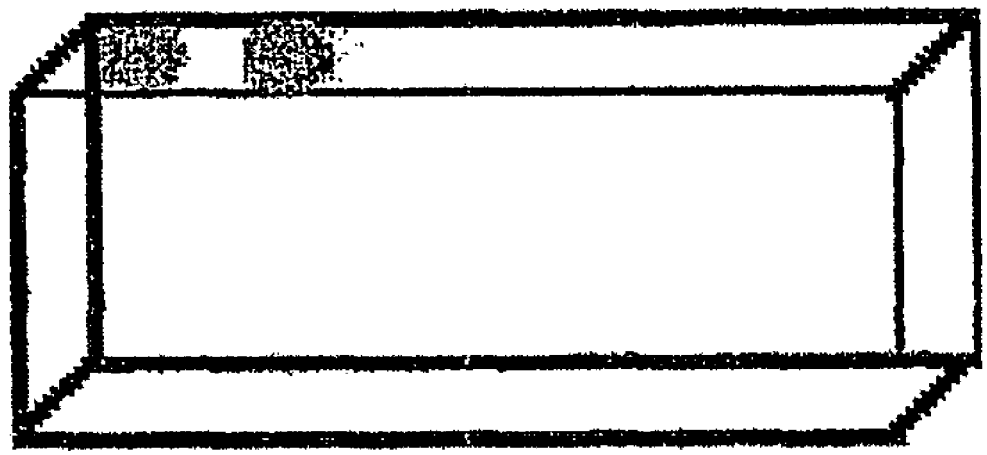
FIG. 4 illustrates a site to which the photo-curable adhesive composition according to an embodiment of the present invention is applied when a beam splitter is adhered to a base in an optical pick-up device.

FIG. 4 illustrates a site to which the photo-curable adhesive composition according to an embodiment of the present invention is applied when a beam splitter is adhered to a base in an optical pick-up device. After the photo-curable resin composition of the present invention is applied to two points of the beam splitter, the beam splitter may be placed on the base and exposed to light to cure the composition.

Figure 5:
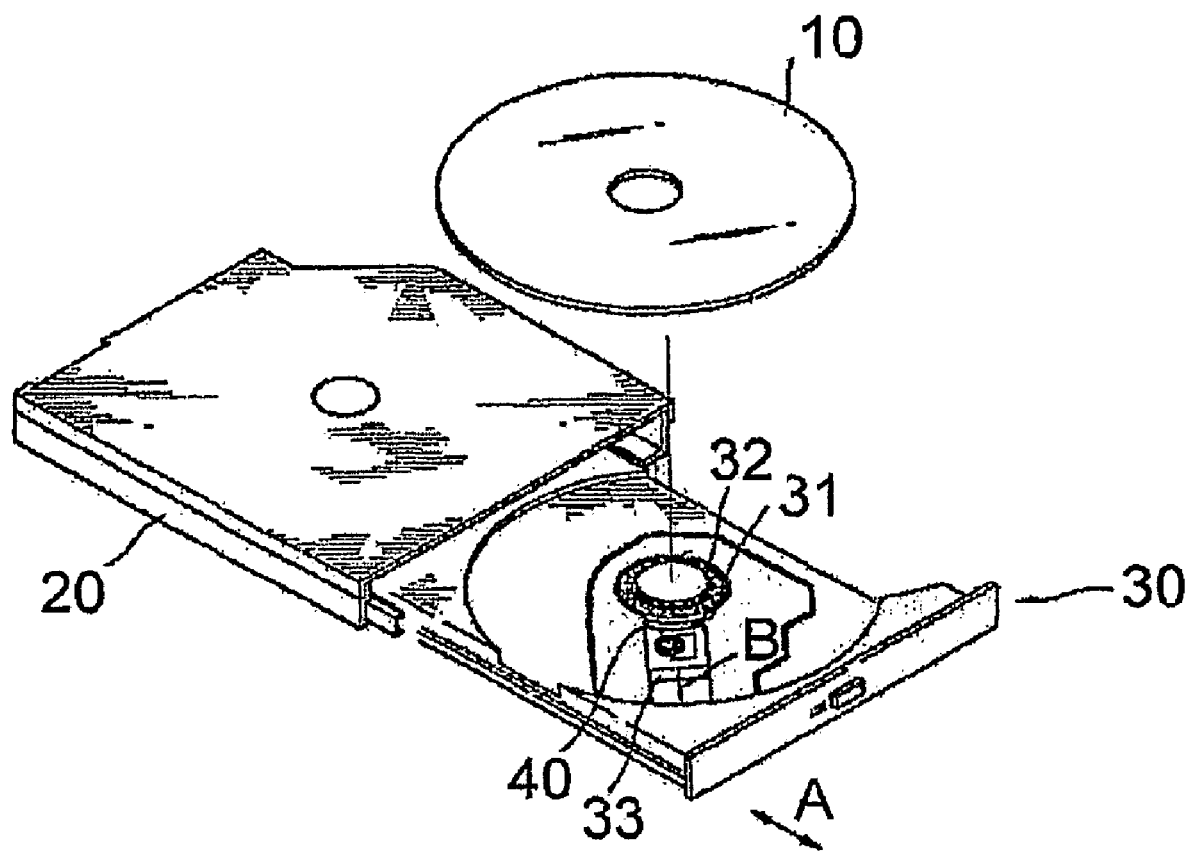
FIG. 5 illustrates an optical recording/reproducing drive with an optical pick-up device using the photo-curable adhesive composition according to an embodiment of the present invention.

FIG. 5 illustrates an optical recording/reproducing drive with an optical pick-up device using the photo-curable adhesive composition according to an embodiment of the present invention. Referring to FIG. 5, a tray 30 may be engaged into the track of a housing 20 in such a manner that it slides in and out of the housing in the direction of arrow "A". The tray 30 may be equipped with a spindle motor 31 and a pick-up base 33. The spindle motor 31 may have a turntable 32 on the rotating shaft thereof. When an optical disk 10 is set on the turntable 32, the spindle motor 31 may start to rotate the optical disk 10. The pick-up base 33 may slide along a radial direction (indicated by arrow "B") of the optical disk 10. An optical pick-up device 40 for accessing the recording surface of the optical disk 10 and recording/reproducing information therefrom may be mounted on the pick-up base 33.

The photo-curable adhesive composition according to the present invention may exhibit desirable properties such as low shrinkage and high adhesion. Therefore, devices using the same may have optical elements well-secured to a base, and thus distortion and/or displacement of the optical elements may be prevented, enabling enhanced precision in the manufacture of the devices. Moreover, lowering of the performance of electronic devices caused by the application of adhesives to undesirable sites may be prevented.

Hereinafter, the present invention will be described with reference to the following Examples. It will be understood that these Examples are provided for descriptive purposes only and not for purposes of limitation.

Methods of preparation of oligourethanes for photo-curable adhesive compositions according to embodiments of the present invention are presented in Examples 1 and 2, below.

Example 1

Preparation of oligodieneurethanemethacrylate OUMD-3000H 150 g of liquid oligobutadienediol (Krasol LBH-2000, Kauchuk Co., Czech Republic) was loaded into a reactor and stirred while being heated to 45-50° C. 18.6 g of hexamethylene diisocyanate was added at a rate of 1 g/min at temperature 55-60° C. When the addition was completed, the reaction mass was stirred for 4.5-5 hours at 55-60° C. until isocyanate groups reached 2.75%, at which point the mixture was cooled to 45-50° C.

Then, a mixture of 0.093 g of dibutyl tin caprylate catalyst dissolved in 17.76 g of monomethacrylate propyleneglycol was gradually added into the reactor at a rate of 1 g/min, the temperature not exceeding 50-55° C. When the addition was completed, the reactive mass was stirred for 7-8 hours at 55-60° C. until isocyanate groups were consumed, 0.0186 g of p-methoxyphenol was added and the resultant mixture was stirred for 30 minutes.

The product was a colorless or light yellowish viscous mass. Dynamic viscosity is 66,000 mPa·s.

Example 2

Preparation of oligodieneurethanemethacrylate OUMD-3000T

The synthesis was performed in the same manner as in Example 1, above, except that 2,4-toluylene diisocyanate was used as the diisocyanate.

Example 3 and Comparative Examples 4-6

Preparation of Photo-Curable Compositions

The components of the compositions prepared in Example 3 and Comparative Examples 4-6 are tabulated in FIG. 6. The compositions were prepared by thoroughly mixing the respective components in a mixer.

Physical and Mechanical Properties of the Cured Photo-Curable Compositions

FIG. 7 tabulates shrinkage, tensile strength and storage stability of cured compositions corresponding to the Example 3 and the Comparative Examples 4-6 of FIG. 6.

Shrinkage was determined based on the density ratio of the liquid and cured adhesive compositions.

Tensile strength was determined on adhesive joints of polymethyl methacrylate glass of grade CO-120K (Russia), sample size 50×50×6 mm, with cylindrically-formed steel, 12×18H10T with a diameter of 25 mm using an Instron tearing machine at a test rate of 20 mm per minute at +25° C.

Referring to FIG. 7, the tensile strength measurements indicated by I reflect strength 24 hours after adhering, the tensile strength measurements indicated by II reflect strength of the bonded samples after they were exposed to +60° C. temperature and 95% humidity for 72 hours, and the tensile strength measurements indicated by III reflect strength after thermocycling (20 cycles) between +70° C. (1 hour) and −30° C. (1 hour).

Referring to FIGS. 6 and 7, the photo-curable adhesive composition according to an embodiment of the present invention exhibits shrinkage and adhesive strength characteristics that desired for securing optical elements in electronic devices.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A photo-curable adhesive composition, comprising:
an oligourethane acrylate in a range of about 10 to about 30% by weight;
a reactive monomer-diluent in a range of about 32 to about 46% by weight;
a polymeric filler in a range of about 20 to about 30% by weight;
a photoinitiator in a range of about 2.5 to about 5.0% by weight;
an antioxidant in a range of about 0.005 to about 0.02% by weight;
a chlorinated polyvinyl chloride in a range of about 3.0 to about 10%, the chlorinated polyvinyl chloride having a chlorine content of about 62 to about 64% by weight;
oxalic acid in a range of about 0.3 to about 2.0% by weight;
a thixotropic agent in a range of about 0.5 to about 3.0% by weight; and
a plasticizer in a range of about 1.0 to about 10.0% by weight, based on the total weight of the composition.

2. The composition as claimed in claim 1, wherein the chlorinated polyvinyl chloride and the oxalic acid are added as an adhesion promoter, the chlorinated polyvinyl chloride and the oxalic acid added in a mass ratio in a range of about 5:1 to about 10:1.

3. The composition as claimed in claim 1, wherein the oligourethane acrylate is a mixture of aliphatic and aromatic oligobutadiene urethane methacrylate, the aliphatic and aromatic oligobutadiene urethane methacrylate mixed in a mass ratio in a range of about 1:1 to about 1.5:1.

4. The composition as claimed in claim 1, wherein the reactive monomer-diluent is a mixture of a monofunctional methacrylate having cyclic substituents, a methacrylate of a higher alcohol, and a polyfunctional methacrylate.

5. The composition as claimed in claim 1, wherein the polymeric filler includes powdered high density polyethylene having a grain size of about 50 μm or less.

6. An optical pick-up device, comprising:
a base; and at least one optical element that is adhered to the base using a photo-curable adhesive composition, the photo-curable adhesive composition including:

an oligourethane acrylate in a range of about 10 to about 30% by weight;

a reactive monomer-diluent in a range of about 32 to about 46% by weight;

a polymeric filler in a range of about 20 to about 30% by weight;

a photoinitiator in a range of about 2.5 to about 5.0% by weight;

an antioxidant in a range of about 0.005 to about 0.02% by weight;

a chlorinated polyvinyl chloride in a range of about 3.0 to about 10%, the chlorinated polyvinyl chloride having a chlorine content of about 62 to about 64% by weight;

oxalic acid in a range of about 0.3 to about 2.0% by weight;

a thixotropic agent in a range of about 0.5 to about 3.0% by weight; and a plasticizer in a range of about 1.0 to about 10.0% by weight, based on the total weight of the composition.

7. The optical pick-up device as claimed in claim 6 wherein the optical element is at least one of an optical diode, a grating, a collimating lens, a beam splitter, a reflective mirror, a light detector, a front light detector, an objective lens, a concave lens, and a base cover.

8. The optical pick-up device as claimed in claim 7, wherein the optical element is disposed in a light path of an optical recording/reproducing drive.

9. A photo-curable adhesive composition, the photo-curable composition prepared by mixing an oligourethane acrylate; a reactive monomer-diluent; a polymeric filler; a photoinitiator; an antioxidant; a chlorinated polyvinyl chloride having a chlorine content of about 62 to about 64%; oxalic acid; a thixotropic agent; and a plasticizer, wherein:

the oligourethane acrylate is added in a range of about 10 to about 30% by weight, the reactive monomer-diluent is added in a range of about 32 to about 46% by weight, the polymeric filler is added in a range of about 20 to about 30% by weight, the photoinitiator is added in a range of about 2.5 to about 5.0% by weight, the antioxidant is added in a range of about 0.005 to about 0.02% by weight, the chlorinated polyvinyl chloride is added in a range of about 3.0 to about 10% by weight, the oxalic acid is added in a range of about 0.3 to about 2.0% by weight, the thixotropic agent is added in a range of about 0.5 to about 3.0% by weight, and the plasticizer is added in a range of about 1.0 to about 10.0% by weight, based on the total weight of the composition.

10. The photo-curable adhesive composition as claimed in claim 9, wherein the oligourethane acrylate includes a first oligourethane acrylate and a second oligourethane acrylate, and the first and second oligourethane acrylates, combined, are added in a range of about 10 to about 30% by weight, based on the total weight of the composition.

11. The photo-curable adhesive composition as claimed in claim 10, wherein the first oligourethane acrylate is prepared by:

adding hexamethylene diisocyanate to oligobutadienediol and allowing them to react;

adding a solution containing dibutyl tin caprylate dissolved in monomethacrylate propyleneglycol to the reaction product of the hexamethylene diisocyanate and oligobutadienediol;

allowing substantially all of any remaining isocyanate groups to react; and adding p-methoxyphenol.

12. The photo-curable adhesive composition as claimed in claim 11, wherein the oligobutadienediol, the hexamethylene diisocyanate and the monomethacrylate propyleneglycol are combined in molar ratio of about 1:2:2.

13. The photo-curable adhesive composition as claimed in claim 11, wherein the oligobutadienediol is a polymerization product of 1,3-butadiene containing monomer links through 1,4- and 1,2-addition reactions, the oligobutadienediol containing about 30% of 1,4-adducts and about 70% of 1,2-adducts.

14. The photo-curable adhesive composition as claimed in claim 10, wherein the second oligourethane acrylate is prepared by:

adding 2,4-toluylene diisocyanate to oligobutadienediol and allowing them to react;

adding a solution containing dibutyl tin caprylate dissolved in monomethacrylate propyleneglycol to the reaction product of the 2,4-toluylene diisocyanate and oligobutadienediol;

allowing substantially all of any remaining isocyanate groups to react; and adding p-methoxyphenol.

15. The photo-curable adhesive composition as claimed in claim 14, wherein the oligobutadienediol, the 2,4-toluylene diisocyanate and the monomethacrylate propyleneglycol are combined in molar ratio of about 1:2:2.

16. The photo-curable adhesive composition as claimed in claim 14, wherein the oligobutadienediol is a polymerization product of 1,3-butadiene containing monomer links through 1,4- and 1,2-addition reactions, the oligobutadienediol containing about 30% of 1,4-adducts and about 70% of 1,2-adducts.

17. The photo-curable adhesive composition as claimed in claim 9, wherein the chlorinated polyvinyl chloride and the oxalic acid are present in a mass ratio in a range of about 5:1 to about 10:1.

* * * * *